(12) United States Patent
Hui et al.

(10) Patent No.: US 10,104,712 B2
(45) Date of Patent: *Oct. 16, 2018

(54) OBTAINING DATA RECEPTION PARAMETERS ON-DEMAND IN A MULTIPLE INTERFACE NETWORK

(71) Applicant: Cisco Technology, Inc., San Jose, CA (US)

(72) Inventors: Jonathan W. Hui, Belmont, CA (US); Wei Hong, Berkeley, CA (US); Jean-Philippe Vasseur, Saint Martin d'Uriage (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/387,607

(22) Filed: Dec. 21, 2016

(65) Prior Publication Data

US 2017/0099684 A1 Apr. 6, 2017

Related U.S. Application Data

(63) Continuation of application No. 13/945,687, filed on Jul. 18, 2013, now Pat. No. 9,549,363.

(51) Int. Cl.
*H04W 76/40* (2018.01)
*H04W 76/00* (2018.01)
(Continued)

(52) U.S. Cl.
CPC ............ *H04W 76/40* (2018.02); *H04L 45/14* (2013.01); *H04L 45/16* (2013.01); *H04L 45/22* (2013.01);
(Continued)

(58) Field of Classification Search
CPC ...... H04W 24/02; H04W 24/04; H04W 28/18; H04W 40/14; H04W 40/246;
(Continued)

(56) References Cited

U.S. PATENT DOCUMENTS 6,088,591 A * 7/2000 Trompower ......... H04B 1/7143
370/331
6,574,232 B1 * 6/2003 Honig ..................... H04L 47/15
370/413

(Continued)

OTHER PUBLICATIONS

Pancholi, "Final Office Action issued in copending U.S. Appl. No. 13/945,874, filed Jul. 18, 2013, dated Oct. 2, 2015", 1-37.

(Continued)

*Primary Examiner* — Rina C Pancholi
(74) *Attorney, Agent, or Firm* — Johnson, Marcou & Isaacs, LLC

(57) ABSTRACT

In a multi-PHY, low power and lossy network comprising a plurality of nodes, a sender determines that a dwell time threshold limit for transmission of data will be exceeded by transmission of the data over a first network interface or that the recipient is unknown. The sender determines transmission parameters for the transmission of the data over the first network interface and transmits the transmission parameters to a receiver device over a second network interface that is different than the first network interface. The sender determines a channel on the first network interface for transmission of the data and transmits the determined channel with the transmission parameters to the receiver, or the receiver determines the channel on the first network interface for transmission of the data and transmits an indication of the determined channel to the sender in response to receiving the transmission parameters.

20 Claims, 9 Drawing Sheets

(51) Int. Cl.
*H04L 12/707* (2013.01)
*H04L 12/721* (2013.01)
*H04L 12/761* (2013.01)
*H04W 40/14* (2009.01)
*H04W 84/18* (2009.01)

(52) U.S. Cl.
CPC ......... *H04W 40/14* (2013.01); *H04W 76/002* (2013.01); *H04W 84/18* (2013.01)

(58) Field of Classification Search
CPC ...... H04W 84/18; H04W 88/06; H04L 45/22; H04L 45/14; H04L 45/16; H04L 45/48
See application file for complete search history.

(56) References Cited

U.S. PATENT DOCUMENTS

| | | | |
|---|---|---|---|
| 7,269,403 B1 | 9/2007 | Miao et al. | |
| 2008/0096560 A1 | 4/2008 | Felske et al. | |
| 2008/0101393 A1 | 5/2008 | Noumi et al. | |
| 2009/0034438 A1* | 2/2009 | Soulie | H04L 5/0092 370/280 |
| 2009/0232008 A1 | 9/2009 | Wurst et al. | |
| 2011/0176416 A1 | 7/2011 | Bhatti et al. | |
| 2011/0310929 A1 | 12/2011 | Petite et al. | |
| 2012/0117268 A1 | 5/2012 | Shaffer et al. | |
| 2013/0003672 A1 | 1/2013 | Dinan | |
| 2013/0028247 A1 | 1/2013 | Li et al. | |
| 2014/0153923 A1* | 6/2014 | Casaccia | H04B 10/1149 398/58 |
| 2015/0023363 A1 | 1/2015 | Hui et al. | |
| 2015/0023369 A1 | 1/2015 | Hui et al. | |

OTHER PUBLICATIONS

Pancholi, "Final Office Action issued in U.S. Appl. No. 13/945,874, filed Jul. 18, 2013", dated Sep. 7, 2016, 44 pages.
Pancholi, "Office Action issued in copending U.S. Appl. No. 13/945,687, filed Jul. 18, 2013, dated Feb. 11, 2015", 1-34.
Pancholi, "Office Action issued in copending U.S. Appl. No. 13/945,874, filed Jul. 18, 2013, dated Feb. 20, 2015", 1-33.
Pancholi, "Office Action issued in U.S. Appl. No. 13/945,874, filed Jul. 18, 2013", dated Feb. 12, 2016, 1-46.
Pancholi, "Office Action issued U.S. Appl. No. 13/945,687, filed Jul. 18, 2013, dated Oct. 6, 2015", dated Feb. 16, 2016, 1-49.
Pancholi, "Office Action issued U.S. Appl. No. 13/945,687, filed Jul. 18, 2013, dated Oct. 6, 2015", 1-39.

* cited by examiner

OBTAINING DATA RECEPTION PARAMETERS ON-DEMAND IN A MULTIPLE INTERFACE NETWORK

CROSS-REFERENCE TO RELATED APPLICATIONS

This patent application is a continuation of and claims priority to U.S. Non-Provisional patent application Ser. No. 13/945,687, filed Jul. 18, 2013, and entitled "Obtaining Data Reception Parameters On-Demand in a Multiple Interface Network." The entire disclosure of the above-identified priority application is hereby fully incorporated herein by reference.

TECHNICAL FIELD

The present disclosure relates generally to computer networks and, more particularly, to improving the efficiency and effectiveness of automatic repeat requests in networks comprising devices with multiple communication interfaces.

BACKGROUND

Constrained networks include, for example, Low power and Lossy Networks (LLNs), such as sensor networks. These constrained networks have a myriad of applications, such as Smart Grid, Smart Cities, home and building automation, etc. Various challenges are presented with LLNs, such as lossy links, low bandwidth, battery operation, low memory and/or processing capability, etc. Large-scale internet protocol (IP) smart object networks pose a number of technical challenges. For instance, the degree of density of such networks (such as Smart Grid networks with a large number of sensors and actuators, smart cities, or advanced metering infrastructure (AMI) networks) may be extremely high. For example, it is not rare for each node to see several hundreds of neighbors. This architecture is particularly problematic for LLNs, where constrained links can wreak havoc on data transmission.

Network transmissions are often constrained by regulatory compliance and dwell time limitations that squelch transmissions when the transmission time on a given channel exceeds the specified dwell time. While the dwell time limitation ensures regulatory compliance, it can add unwanted delays.

DESCRIPTION OF EXAMPLE EMBODIMENTS

Overview

Figure 1:
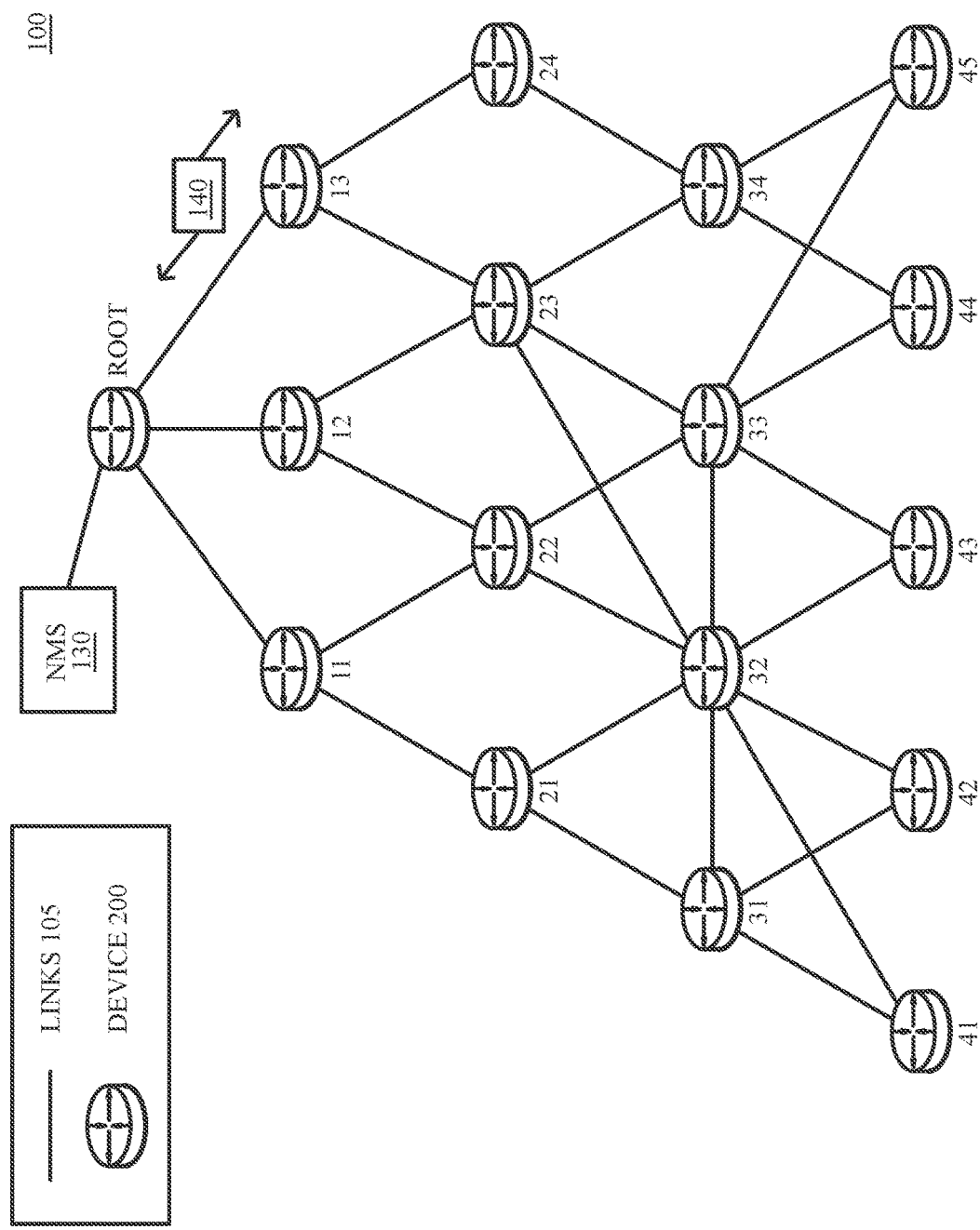
FIG. 1 is a diagram depicting an example communication network in accordance with certain example embodiments.

According to one or more embodiments of the disclosure, in a multi-PHY, low power and lossy network (LLN) comprising a plurality of nodes, a sender device determines that a dwell time threshold limit for transmission of data will be exceeded by transmission of the data over a first network interface. In another example, the sender device has a data packet to transmit to a new recipient device. The sender device does not know the transmission parameters required to communicate with the recipient device. In the example embodiments, the sender device determines the transmission parameters for the transmission of the data over the first network interface and transmits the transmission parameters to a receiver device over a second network interface that is different than the first network interface. The sender device determines a channel on the first network interface for transmission of the data and transmits the determined channel with the transmission parameters to the receiver device. In an alternative example embodiment, the receiver device determines the channel on the first network interface for transmission of the data and transmits an indication of the determined channel to the sender device. The sender device then transmits the data over the determined channel in the first network interface.

Description

Referring to the drawings, in which like numerals represent like (but not necessarily identical) elements throughout the figures, example embodiments are described.

A computer network is a geographically distributed collection of nodes interconnected by communication links and segments for transporting data between end nodes. Nodes and end nodes include, for example, personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network that is generally considered a self-configuring network of mobile routes (and associated hosts) connected by wireless links, the union of which forms an arbitrary topology.

Smart object networks, such as sensor networks, are a specific type of network having spatially distributed autonomous devices, such as sensors, actuators, etc., that cooperatively monitor physical or environmental conditions at different locations, such as, for example, energy/power consumption, resource consumption (for example, water/ gas/etc. for advanced metering infrastructure or "AMI" applications), temperature, pressure, vibration, sound, radiation, motion, pollutants, etc. Other types of smart objects include actuators, for example, responsible for turning on/off an engine or performing any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port (such as PLC), a microcontroller, and an energy source (such as a battery). Often, smart object networks are considered field area networks (FANs), neighborhood area networks (NANs), etc. Generally, size and cost constraints on smart object nodes (for example, sensors) result in corresponding constraints on resources, such as energy, memory, computational speed, and bandwidth.

Mesh networks have become increasingly popular and practical in recent years. In particular, shared-media mesh networks, such as wireless or PLC networks, etc., are often on what is referred to as Low Power and Lossy Networks (LLNs). LLNs are a class of network in which both the routers and their interconnects are constrained: LLN routers typically operate with constraints (for example, processing power, memory, and/or energy (battery)), and their interconnects are characterized by, illustratively, high loss rates, low data rates, and/or instability. LLNs are comprised of any range from a few dozen or up to thousands or even millions of LLN routers and support point-to-point traffic (between devices inside the LLN), point-to-multipoint traffic (from a central control point, such as the root node, to a subset of devices inside the LLN), and multipoint-to-point traffic (from devices inside the LLN towards a central control point).

Loosely, the term "Internet of Things" or "IoT" may be used by those in the network field to refer to uniquely identifiable objects (things) and their virtual representations in a network-based architecture. In particular, the next frontier in the evolution of the Internet is the ability to connect more than just computers and communications devices, but also the ability to connect "objects" in general, such as lights, appliances, vehicles, HVAC (heating, ventilating, and air-conditioning), windows, window shades, and blinds, doors, locks, etc. The "Internet of Things" thus generally refers to the interconnection of objects (for example, smart objects), such as sensors and actuators, over a computer network (for example, internet protocol ("IP")), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, building and industrial automation, and cars (for example, that can interconnect millions of objects for sensing things like power quality, tire pressure, and temperature, and that can actuate engines and lights), it has been of the utmost importance to extend the IP protocol suite for these networks.

FIG. 1 is a schematic block diagram of an example computer network 100 illustratively comprising nodes/devices 200 (for example, labeled as shown, "root," "11," "12," . . . "45," and described in FIG. 2 below) interconnected by various methods of communication. For instance, the links 105 may be wired links or shared media (for example, wireless links, PLC links, etc.) where certain nodes 200 (such as, for example, routers, sensors, computers, etc.) may be in communication with other nodes 200, for example, based on distance, signal strength, current operational status, location, etc. Those skilled in the art will understand that any number of nodes, devices, links, etc. may be used in the computer network and that the view illustrated herein is for simplicity. Also, those skilled in the art will further understand that while the network is shown in a certain orientation, particularly with a "root" node, the network 100 is merely an example illustration that is not meant to limit the disclosure. In addition, a network management server (NMS) 130, or other head-end application device located beyond the root device (for example, via a WAN), may also be in communication with the network 100.

Data packets 140 (for example, traffic and/or messages sent between the devices/nodes) may be exchanged among the nodes/devices of the computer network 100 using predefined network communication protocols, such as certain known wired protocols, wireless protocols (for example, IEEE Std. 15.15.4, WiFi, Bluetooth®, etc.), PLC protocols, or other shared-media protocols where appropriate. In this context, a protocol comprises of a set of rules defining how the nodes interact with each other.

Figure 2:
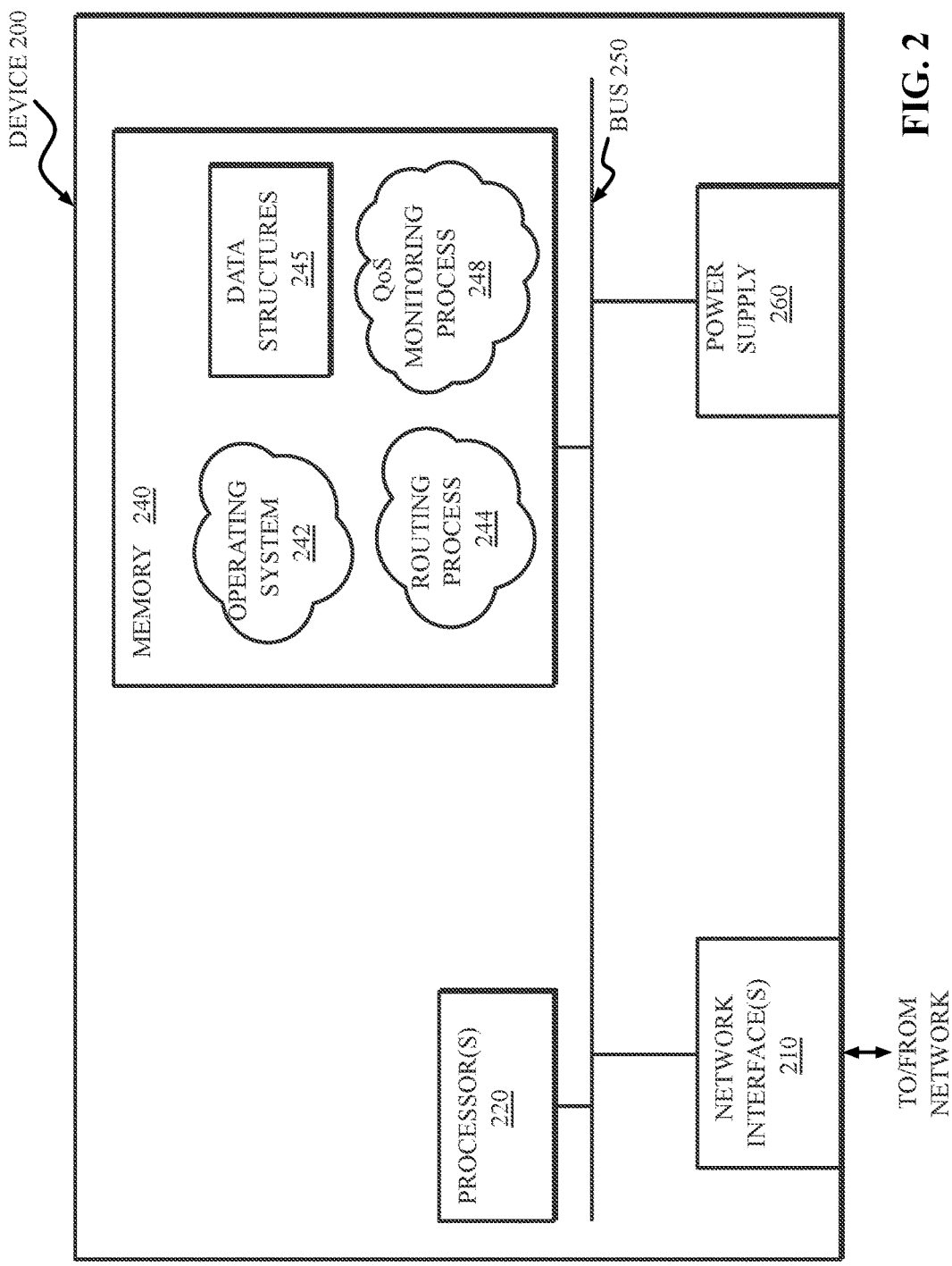
FIG. 2 is a block diagram depicting an example network device/node in accordance with certain example embodiments.

FIG. 2 is a schematic block diagram of an example node/device 200 that may be used with one or more embodiments described herein, for example, as any of the nodes shown in FIG. 1 above. The device 200 may comprise one or more network interfaces 210 (for example, wired, wireless, PLC, etc.), at least one processor 220, and a memory 240 interconnected by a system bus 250, as well as a power supply 260 (for example, battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have multiple types of network connections 210, for example, wireless and wired/physical connections, and that the view depicted herein is merely for illustration. Also, while the network interface 210 is shown separately from the power supply 260, the network interface 210 may communicate through the power supply 260 or may be an integral component of the power supply, for example, for PLC. In some specific configurations, the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (for example, no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor 220, functionally organizes the device by, inter alia, invoking operations in support of software processes and/or services executing on the device. These software processes and/or services may comprise routing process/services 244 and an illustrative "QoS monitoring" process 248, as described herein. Note that while QoS monitoring process 248 is shown in centralized memory 240, alternative embodiments provide for the process to be specifically operated within the network interfaces 210, such as a component of a network layer operation within the network interfaces 210 (as process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (for example, according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols, as will be understood by those skilled in the art. These functions may, on capable devices, be configured to manage a routing/forwarding table (a data structure 245) containing, for example, data used to make routing/forwarding decisions. In particular, in proactive routing, connectivity is discovered and known prior to computing routes to any destination in the network, for example, using link state routing such as Open Shortest Path First (OSPF), Intermediate-System-to-Intermediate-System (ISIS), or Optimized Link State Routing (OLSR). Reactive routing, on the other hand, discovers neighbors (in other words, it does not have an a priori knowledge of network topology) and, in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), for example, certain sensor networks, may be used in a myriad of applications, such as for "Smart Grid" and "Smart Cities." A number of challenges in LLNs have been presented, such as:
1) Links are generally lossy, such that a Packet Delivery Rate/Ratio (PDR) can dramatically vary due to various sources of interferences, for example, considerably affecting bit error rate (BER);
2) Links are generally low bandwidth, such that control plane traffic must generally be bounded and negligible compared to the low rate data traffic;
3) A number of use cases require specifying a set of link and node metrics, some of them being dynamic, thus requiring specific smoothing functions to avoid routing instability, which considerably drains bandwidth and energy;
4) Constraint-routing may be required by some applications, for example, to establish routing paths that will avoid non-encrypted links, nodes running low on energy, etc.;
5) Scale of the networks may become very large, for example, on the order of several thousands to millions of nodes; and
6) Nodes may be constrained with low memory, a reduced processing capability, a low power supply (for example, battery), etc.

In other words, LLNs are a class of network in which both the routers and their interconnect are constrained: LLN routers typically operate with constraints, for example, processing power, memory, and/or energy (battery), and their interconnects are characterized by, illustratively, high loss rates, low data rates, and/or instability. LLNs are comprised of anything from a few dozen and up to thousands or even millions of LLN routers. Additionally, LLNs support point-to-point traffic (between devices inside the LLN), point-to-multipoint traffic (from a central control point to a subset of devices inside the LLN), and multipoint-to-point traffic (from devices inside the LLN towards a central control point).

An example implementation of LLNs is an "Internet of Things" network. As described above, the term "Internet of Things" or "IoT" may be used by those in the art to refer to uniquely identifiable objects (things) and their virtual representations in a network-based architecture. In particular, the term "IoT" generally refers to the interconnection of objects (for example, smart objects), such as sensors and actuators, over a computer network (for example, IP), which may be the Public Internet or a private network. Such devices have been used in the industry for decades, usually in the form of non-IP or proprietary protocols that are connected to IP networks by way of protocol translation gateways. With the emergence of a myriad of applications (for example, smart grid, smart cities, building and industrial automation, etc.), it has been of the utmost importance to extend the IP protocol suite for these networks.

One example protocol is specified in Internet Engineering Task Force (IETF) Proposed Standard, Request for Comment (RFC) 6550, entitled "RPL: IPv6 Routing Protocol for Low Power and Lossy Networks" by Winter, et al. (March 2012). This protocol provides a mechanism that supports multipoint-to-point (MP2P) traffic from devices inside the LLN towards a central control point (for example, LLN Border Routers (LBRs) or "root nodes/devices" generally), as well as point-to-multipoint (P2MP) traffic from the central control point to the devices inside the LLN (and also point-to-point or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are contained in paths oriented toward and terminating at one or more root nodes (for example, "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, in other words, at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (for example, the farther away a node is from a root, the higher the rank of that node). Further, in certain embodiments, a sibling of a node within a DAG may be defined as any neighboring node that is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (for example, by a DAG process) based on an Objective Function (OF). The role of the objective function is generally to specify rules on how to build the DAG (for example, number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. Alternatively, the constraints and metrics may be separated from the objective function. Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc. are considered "DAG parameters."

Illustratively, example metrics used to select paths (for example, preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (for example, wired, wireless, etc.), etc. The objective function may provide rules defining the load balancing requirements, such as a number of selected parents (for example, single parent trees or multi-parent DAGs). Notably, an example for how routing metrics and constraints may be obtained may be found in an IETF Internet Draft, entitled "Routing Metrics used for Path Calculation in Low Power and Lossy Networks" <draft-ietf-roll-routing-metrics-19> by Vasseur, et al. (Mar. 1, 2011 version). Further, an example objective function (for example, a default objective function) may be found in an IETF RFC, entitled "RPL Objective Function 0" <RFC 6552> by Thubert (March 2012 version) and "The Minimum Rank Objective Function with Hysteresis" <RFC 6719> by O. Gnawali et al. (September 2012 version).

Building a DAG may utilize a discovery mechanism to build a logical representation of the network and a route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, for example, following the orientation of the edges within the DAG. Conversely, "downward" or "down" paths are routes that lead in the direction from DAG roots towards leaf nodes, for example, generally going in the opposite direction to the upward messages within the DAG.

Generally, a DAG discovery request (for example, DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (for example, DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
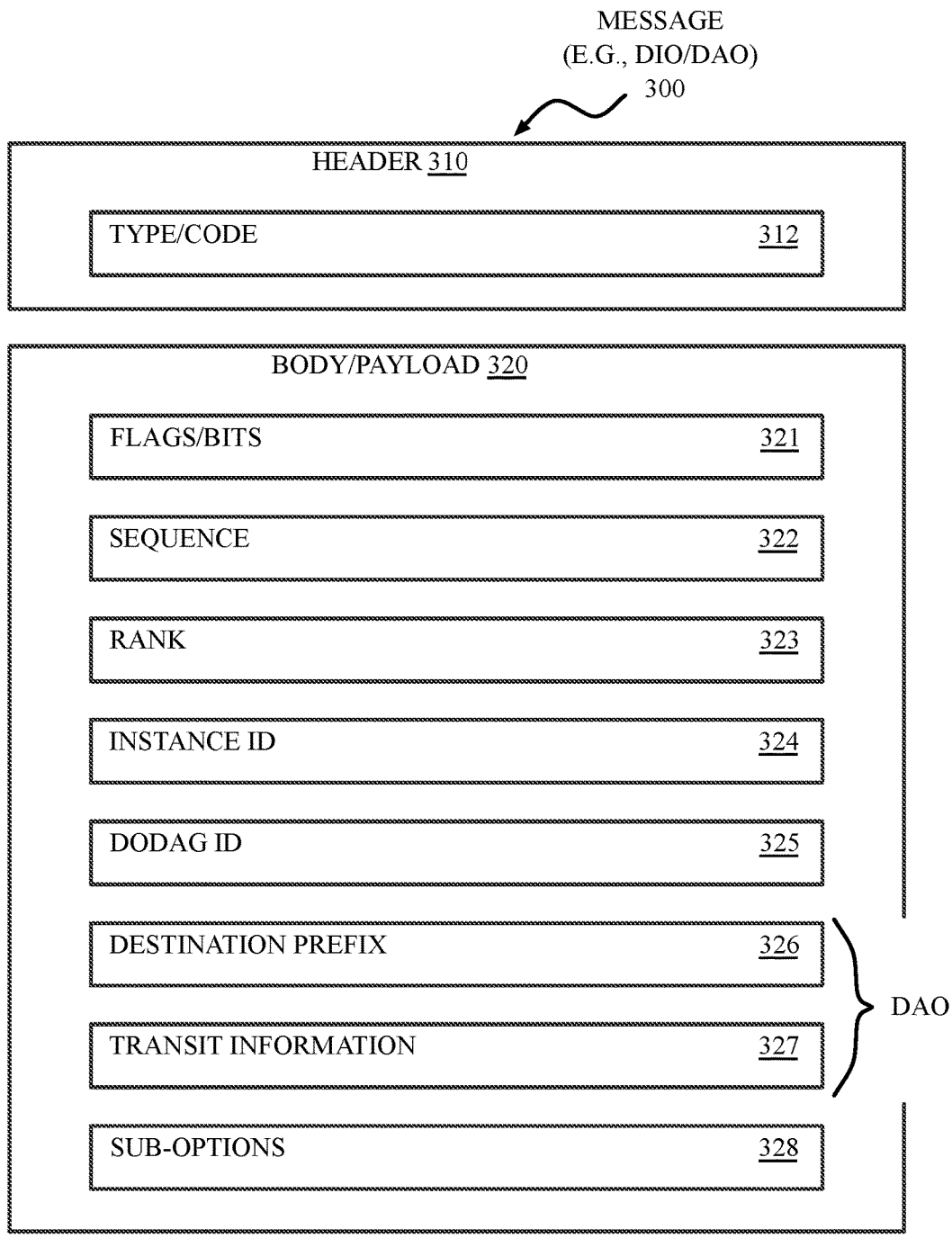
FIG. 3 is a block diagram depicting packet header and payload organization in accordance with certain example embodiments.

FIG. 3 illustrates an example simplified control message format 300 that may be used for discovery and route dissemination when building a DAG, for example, as a DIO, DAO, or DIS message. Message 300 illustratively comprises a header 310 with one or more fields 312 that identify the type of message (for example, a RPL control message) and a specific code indicating the specific type of message, for example, a DIO, DAO, or DIS. Within the body/payload 320 of the message may be a plurality of fields used to relay pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (for example, DAO_Sequence used for acknowledgements (ACKs), etc.). For any type of message 300, one or more additional sub-option fields 328 may be used to supply additional or custom information within the message 300. For instance, an objective code point (OCP) sub-option field may be used within a DIO to carry codes specifying a particular objective function to be used for building the associated DAG. Alternatively, sub-option fields 328 may be used to carry other information within a message 300, such as indications, requests, capabilities, lists, notifications, etc., for example, in one or more type-length-value (TLV) fields.

Figure 4:
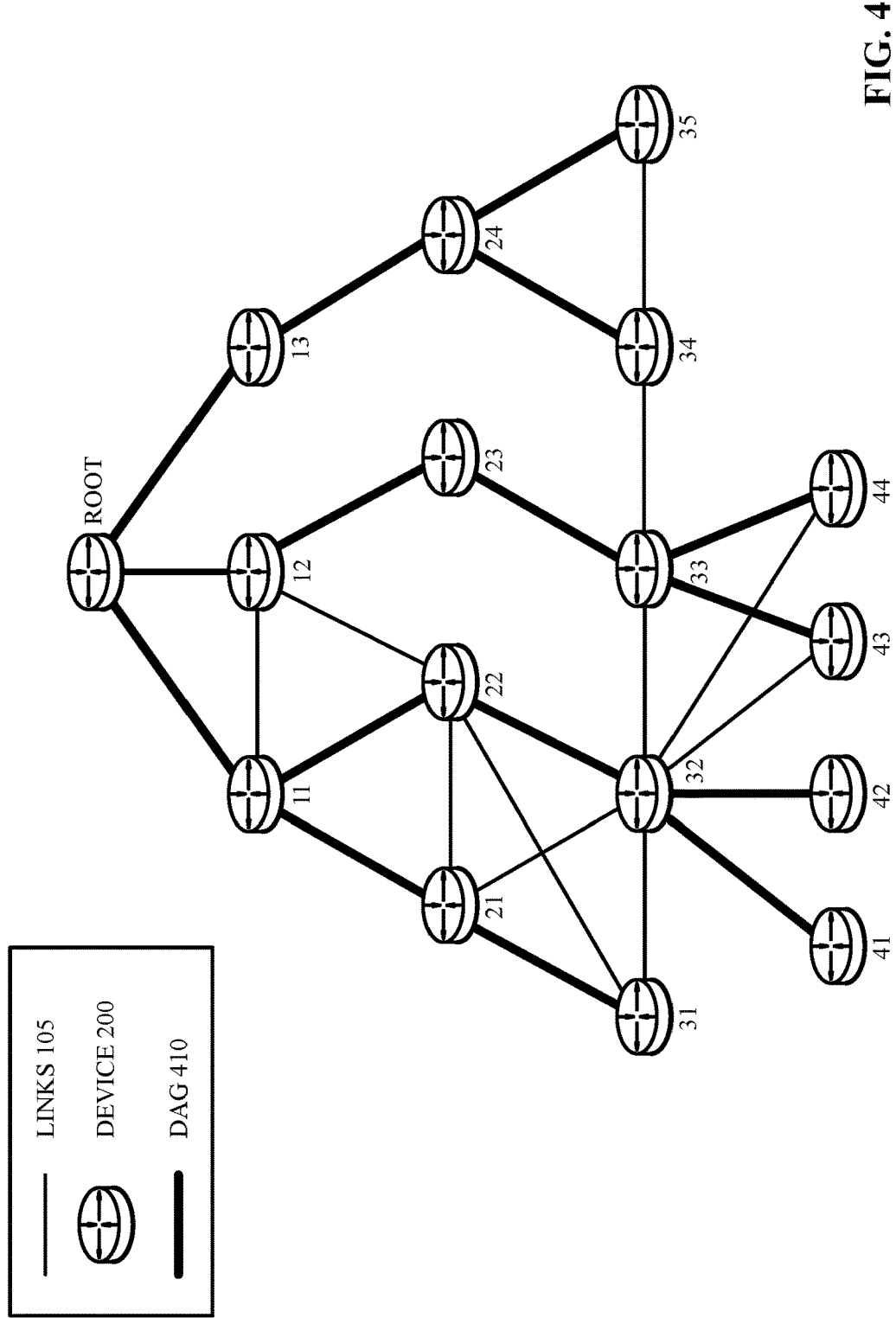
FIG. 4 is a diagram depicting a directed acyclic graph defined within a computer network in accordance with certain example embodiments.

FIG. 4 illustrates an example simplified DAG that may be created, for example, through the techniques described above, within the network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein. Note that although certain examples described herein relate to DAGs, the embodiments of the disclosure are not so limited and may be based on any suitable routing topology, particularly for constrained networks.

As noted above, shared-media communication networks, such as wireless and power-line communication (PLC) networks (a type of communication over power-lines), provide an enabling technology for networking communication and can be used for example in Advanced Metering Infrastructure (AMI) networks, and are also useful within homes and buildings. Interestingly, PLC lines share many characteristics with low power radio (wireless) technologies. In particular, though each device in a given PLC network may be connected to the same physical power-line, due to their noisy environment, a PLC link provides limited range and connectivity is highly unpredictable, thus requiring multi-hop routing when the signal is too weak. For instance, the far-reaching physical media exhibits a harsh noisy environment due to electrical distribution transformers, commercial and residential electric appliances, and cross-talk effects. As an example, even within a building, the average number of hops may be between two and three (even larger when having cross phases), while on an AMI network on the same power phase line the number of hops may vary during a day between one and 15-20. Those skilled in the art would thus recognize that due to various reasons, including long power lines, interferences, etc., a PLC connection may traverse multiple hops. In other words, PLC cannot be seen as a "flat wire" equivalent to broadcast media (such as Ethernet), since they are multi-hop networks by essence.

Furthermore, such communication links are usually shared (for example, by using wireless mesh or PLC networks) and provide a very limited capacity (for example, from a few Kbits/s to a few dozen Kbits/s). LLN link technologies typically communicate over a physical medium that is strongly affected by environmental conditions that change over time. For example, LLN link technologies may include temporal changes in interference (for example, other wireless networks or electric appliances), spatial/physical obstruction (for example, doors opening/closing or seasonal changes in foliage density of trees), and/or propagation characteristics of the physical media (for example, changes in temperature, humidity, etc.). The timescale of such temporal changes may range from milliseconds (for example, transmissions from other wireless networks) to months (for example, seasonal changes of outdoor environment). For example, with a PLC link the far-reaching physical media typically exhibits a harsh noisy environment due to a variety of sources including, for example, electrical distribution transformers, commercial and residential electric appliances, and cross-talk effects. Real world testing suggests that PLC link technologies may be subject to high instability. For example, testing suggests that the number of hops required to reach a destination may vary between 1 and 17 hops during the course of a day, with almost no predictability. It has been observed that RF and PLC links are prone to a number of failures, and it is not unusual to see extremely high Bit Error Rates (BER) with packet loss that may be as high as 50-60%, coupled with intermittent connectivity.

As further noted above, many LLNs, particularly AMI networks, demand that many different applications operate over the network. For example, the following list of applications may operate simultaneously over AMI networks:

1) Automated Meter Reading that involves periodically retrieving meter readings from each individual meter to a head-end server;
2) Firmware upgrades, for example, that involve communicating relatively large firmware images (often 500 KB or more) from a head-end server to one device, multiple devices, or all devices in the network;
3) Retrieving load curves;
4) Real-time alarms generated by meters (for example, power outage events) that actually act as sensors;
5) Periodically retrieving network management information from each meter to a Network Management System (NMS) 130;
6) Supporting demand response applications by sending multicast messages from a head-end device to large numbers of meters;
7) Etc.

One of skill in the art will appreciate that the above-enumerated examples are similar for other types of LLNs.

Generally speaking, these different applications have significantly different traffic characteristics, for example, unicast vs. multicast, small units of data vs. large units of data, low-latency vs. latency-tolerant, flows toward a head-end vs. away from the head-end, etc. Furthermore, since these applications must operate simultaneously over a highly constrained LLN network, the network can easily experience congestion, especially when different applications are sending traffic simultaneously. For example, the bandwidth of LLN links may be as low as a few Kbits/s, and even lower when crossing transformers (for PLC). Without proper mechanisms, these situations can cause networks to violate critical service level agreements (SLAs), for example, delaying the reception of critical alarms from a meter. Accordingly, Quality of Service (QoS) mechanisms are a critical functionality in shared-media communication networks, particularly in highly constrained LLNs.

Numerous QoS mechanisms have been developed for "classic" IP networks (unconstrained), including: (1) packet coloring and classification (for example, by applications or Edge network entry points), (2) congestion avoidance algorithms with random drops for back-pressure on Transmission Control Protocol (TCP) (for example, WRED, etc.), (3) queuing techniques (for example, preemptive queuing+ round robin+dynamic priorities), (4) bandwidth reservation (for example, Diffsery (by CoS), Intsery (RSVP(-TE), etc.), (5) Input/Output shaping (for example, congestion-based traffic shaping), (6) Call Admission Control (CAC) using protocols such as the Resource reSerVation Protocol (RSVP) and/or input traffic shapers, (7) Traffic Engineering, (8) Congestion Avoidance techniques, etc. However, while some of these techniques may apply to LLNs, most are not suitable because they are too costly in terms of bandwidth (control plane overhead), memory (state maintenance), and/ or CPU processing. Indeed, policies must be specified for packet coloring, and queuing techniques and congestion avoidance algorithms, such as WRED, must be configured on nodes. Such algorithms require a deep knowledge of traffic patterns, link layer characteristics, and node resources with respect to a number of parameters to configure each individual device.

Obtaining Data Reception Parameters On-Demand in a Multiple Interface Network

Certain networks utilize a number of different link technologies, including RF, power line communication (PLC), and cellular. Devices in these networks typically communicate only via one of these technologies and are commonly referred to as "singly-PHY" devices. Each link technology provides its own set of strengths and weaknesses. But, a common recurring characteristic is that a single technology is only capable of reaching 95-98% of devices. Networks are currently implemented by modeling the single link technology that provides the best coverage and then attempting to patch the remainder with other technologies.

An alternative approach is to use network devices that support multiple link technologies simultaneously. Devices in these networks are commonly referred to as "multi-PHY" or "multiple interface" devices. For example, the network devices may support RF and PLC communication interfaces. For instance, a device can include a network interface that utilizes both RF and PLC using a single Digital Signal Processor (DSP) chip and two analog front-ends supporting the RF and PLC protocols (for example, IEEE 802.15.4g and IEEE P1901.2, respectively). In one example multi-PHY device, a dual-core DSP is coupled with PLC and RF transceiver frontends. The DSP performs all base-band processing for both PHYs. One core may be dedicated to perform the base-band processing for the first PHY, and the second core may be dedicated to perform the base-band processing for the second PHY, allowing the two PHYs to operate independently and in parallel with each other.

Multiple interface networks (in other words, networks comprising multiple interface devices) are often constrained by regulatory compliance. For example, in RF transmissions, FCC Part 15.247 states that if the 20 dB bandwidth is greater than 250 kHz, the system shall use at least 50 channels and the dwell time limit on each channel shall not exceed 400 ms within a 10 second period. CG-Mesh and other systems utilize the recipient device to determine the channel-hopping schedule. The sender device must then synchronize with the recipient device and transmit according to the recipient device's channel-hopping schedule.

A channel-hopping schedule that never exceeds the dwell time limit when transmitting to a single device is possible. However, transmitting to multiple recipient devices requires coordination in channel-hopping schedules between the receiving devices. The FCC and other regulatory bodies restrict coordination of channel-hopping schedules between the devices.

As a result, CG-Mesh and many other systems implement a dwell time limiter that squelches transmissions when the transmission time on a given channel exceeds a configured dwell time limit. While the dwell time limiter ensures regulatory compliance, unwanted delays may result. These delays occur particularly when the system is under load. That is, when many network elements are attempting to utilize the same channel or other interface element. In some networks, different next hop routes may be utilized. The next hop routes effectively give a device multiple options for the transmission channel. However, cases may exist where multiple next hop routes are not available. For example, the next hop may be the final destination or an additional next hop route may not exist.

In certain cases, the sender can provide the transmission parameters to the receiver before the actual data transmission. However, to provide the transmission parameters, the sender device must transmit data to the recipient device. This transmission may encounter the same delays as the subsequent data transmission.

Certain example networks utilize a network-wide channel-hopping schedule that has relatively long slot durations of 6 seconds. At any given point in time, all devices in the system listen to the same channel. This "slow-hopping" schedule establishes the control channel. Each data transmission is preceded by a Request To Send (RTS) that includes a channel number for the network interface of the actual data and a Clear To Send (CTS) that serves as an acknowledgment to the RTS. After the RTS/CTS exchange, the devices then switch to the channel on the network interface for exchanging the data and acknowledgment frames. Such a system still requires a dwell time limiter for sending control packets and may incur delay when a sender exceeds the dwell time threshold. According to the techniques described herein, the availability of additional network interfaces is utilized to exchange data transmission parameters.

In addition, certain example protocols implement a control channel by using Time Division Multiplexing (TDM) or Frequency Division Multiplexing (FDM) techniques. However, such systems typically utilize such control channels for allocating channel capacity in time and/or frequency and other MAC layer functions, such as network access control, handover, etc. According to the techniques described herein, additional network interfaces that are not necessarily dedicated for control-plane functions are utilized. Furthermore, the communication of transmission parameters can be much more fine-grained, occurring on a packet-by-packet basis. Multiple interface capabilities can be utilized to provide transmission parameters before sending a data packet in LLNs.

Certain example networks use an on-demand approach to pairwise channel-hopping synchronization using a broadcast slot. When attempting to send a message, the sender first determines whether the sender has channel-hopping information for the receiver in the sender's neighbor table. If channel-hopping information exists, the sender transmits the message according to the unicast schedule. Otherwise, the sender transmits the message within a broadcast slot, ensuring that the neighboring device will be listening on the proper channel. The downside of using a broadcast slot is that the transmission incurs additional latency in waiting for the broadcast slot and assumes that a broadcast schedule exists. According to the techniques described herein, a first network interface can be utilized to obtain transmission parameters necessary for communicating on a second network interface.

Certain example systems can utilize a network-wide channel-hopping schedule where all devices in the same network listen to the same channel at any given point in time. Because all devices are synchronized to the same schedule, devices do not need to maintain per-neighbor channel-hopping state. According to the techniques described herein, devices can utilize different channel-hopping schedules, allowing different sender-receiver pairs to communicate simultaneously on different channels. As a result, the techniques described herein may increase channel diversity and channel capacity, and reduce latency.

Certain example systems incorporate a Time Synchronized Mesh Protocol (TSMP) utilizing a channel-hopping strategy that allows both unicast and multicast slots. The multicast slots are not broadcast slots since these multicast slots are not network-wide. A central gateway device computes the hopping schedule for each transmitter-receiver pair. The schedules are distributed using the wireless network. This centralized method can add significant delay and communication overhead to coordinate new schedules between transmitter-receiver pairs. According to the techniques described herein, devices can locally establish their own channel-hopping schedule and synchronize with neighboring devices directly.

According to the techniques described herein, additional network interfaces (or PHYs) are utilized to provide transmission parameters before transmitting a data packet. For example, a first network interface can be used to obtain transmission parameters necessary for communicating on a second network interface.

A sender device or node can continue communicating with a recipient device or node, while not exceeding the dwell time limits required for regulatory compliance, by utilizing a second interface, or PHY, to provide transmission parameters before transmitting a data packet in a multiple interface network.

In an example embodiment, the sender device uses a first interface to communicate transmission parameters to a recipient device. In one example embodiment, the transmission parameters may be communicated using a dedicated control packet (for example, in an IEEE 802.15.4 CMD frame). In another embodiment, the transmission parameters may be associated with an existing data packet (for example, in an IEEE 802.15.4e-2012 Information Element). The transmission parameters may comprise a channel selection, modulation, data rate, and other suitable parameters. The transmission parameters also may include a start delay to indicate when the data transmission is expected to start. Similarly, the transmission parameters may include an end delay to indicate when the data transmission is expected to end. The transmission parameters may indicate a single channel or an alternate channel-hopping schedule. When specifying an alternate channel-hopping schedule, a dwell time for all slots or each slot individually may be specified. The channels may be specified in a list or specified implicitly using a random channel generator.

The transmission parameters are specified to allow the recipient device to configure its transceiver using the same parameters as the sender device. For example, the recipient device must listen on the same channel on which the sender device is transmitting to receive the data packet. Normally, CG-Mesh devices agree on a channel hopping sequence and synchronize in time to ensure that both devices use the same channel. According to the techniques described herein, a sender device can deviate from the standard channel-hopping schedule to avoid dwell time limits.

In another example embodiment, the recipient device can specify the channel for sending an acknowledgment. In one example embodiment, the sender device sends the transmission parameters on a first interface and then begins sending the data packet on a second interface without receiving any feedback from the receiver. In this case, the receiver may send the data acknowledgment using the first interface with the same transmission parameters, using the second interface, or both interfaces. In another embodiment, the recipient device may provide the acknowledgment transmission parameters on the second interface before the sender sends the data packet on the first interface. Having the receiver specify the transmission parameters for the acknowledgement provides a method to ensure that the acknowledgment transmission will not exceed the dwell time limit on the recipient device's side.

In another example embodiment, the sender optionally uses more than one interface to communicate a single data packet. For example, one or more interfaces are used to provide transmission parameters for one or more other interfaces. For instance, the sender device may begin to transmit a data packet on the first interface and include transmission parameters for a second interface. After some delay to allow the recipient device to process the transmission parameters for the second interface, the sender device begins transmitting a data packet on the second interface. In one example embodiment, the data packets may be duplicated on each interface, providing additional redundancy. In another embodiment, the data packets may represent coded segments of the same data packet, allowing the recipient device to combine multiple packets to overcome any bit-errors in transmission and/or increase overall throughput.

Another example embodiment includes dynamically selecting whether or not to deviate from the "default" transmission parameters, where the "default" is the channel hopping schedule determined by the recipient device. In one example embodiment, the sender device only deviates from the default when the sender device expects to exceed the dwell time limit. This approach ensures that a limited amount of additional latency in communicating the transmission parameters is incurred. In another embodiment, the sender device deviates from the default channel hopping schedule when the sender device expects to experience significant contention among multiple other sender devices. By deviating from the recipient device's channel hopping schedule, transmission attempts from other sender devices to the same receiver are less likely to interfere with the data transmission attempts.

LLN devices communicating via RF (for example, IEEE 802.15.4g) can use a channel hopping link layer. This action is driven both by regulatory compliance and efficiency. Each CG-Mesh interface comprises a unicast receive schedule. Neighboring devices must synchronize with the unicast schedule to properly communicate a unicast frame to the first device. By having each device determine the schedule independently, neighboring transmitter-receiver pairs can communicate simultaneously on different channels. CG-Mesh also overlays a PAN-wide broadcast schedule, where all devices in the same PAN are synchronized to the same channel-hopping schedule. The broadcast schedule is only active for a fraction of the time (for example, 25%), but allows efficient broadcasts since a single transmission reaches an arbitrary number of neighbors. This hybrid approach allows CG-Mesh to maximize spectral efficiency for unicast communication while also allowing efficient broadcast communication.

LLN devices communicating via power line communication ("PLC") (for example, IEEE P1901.2) can use an adaptive tone mapping process to optimize transmission parameters to each individual neighbor. The goal of adaptive tone mapping is to maximize throughput and minimize channel utilization by only transmitting on usable subcarriers and optimizing the code-rate without sacrificing robustness. IEEE P1901.2 provides mechanisms to send a tone map request (TMREQ) to a neighboring device. Upon receiving a TMREQ, the receiving device evaluates the received signal, determines the tone map, modulation, data rate, and transmit power settings that the sender should use for future transmissions and includes the evaluation in a tone map reply (TMREP). Devices maintain a neighbor table indicating the quality of each subcarrier, allowing the devices to perform tone mapping for subsequent transmissions to optimize throughput.

Maintaining synchronization of this RF and/or PLC per-neighbor state is costly. Additionally, for unicast schedules, synchronizing with neighbors' unicast schedules can be costly. A device must maintain per-neighbor state for each synchronized neighbor. Furthermore, a device must periodically communicate with the neighbors to correct clock drift. As a result, the cost of maintaining synchronization grows linearly with the number of neighbors with which the device is trying to maintain synchronization. In large-scale LLNs, devices having hundreds of neighbors are common.

An alternative is to obtain transmission parameters in an on-demand fashion. When attempting to communicate with a receiver, the sender first checks for stored transmission parameters for the receiver in the neighbor table. If none are available, the sender performs additional actions to synchronize with the receiver. On RF, one option is to simply use an "asynchronous" transmission, by transmitting across all channels back-to-back. However, doing so consumes significant resources (channel capacity, energy, latency, etc.). In regions where many channels are available, asynchronous transmissions are very costly. Another option is to send a message during the broadcast slot. However, doing so incurs significant latency in waiting for the broadcast slot.

According to the techniques described herein, a first interface, or PHY, transmits parameter settings required for communicating on a second interface. The first interface may be a PLC (for example, IEEE P1901.2) interface, which maintains per-neighbor state for the tone map, modulation, and data rate. The second interface may be an RF (for example, IEEE 802.15.4g) interface, which maintains per-neighbor state for a channel-hopping schedule and time synchronization. Note that while a PLC+RF hardware platform is contemplated in the examples, the techniques described herein are not limited to these interfaces and other interfaces are suitable. For example, devices may utilize a cellular, WiFi, light (for example visible light or infrared light), or other suitable technology interface.

According to one example embodiment, the PLC interface is utilized to obtain a channel-hopping schedule and time synchronization for the RF interface. To obtain channel-hopping information, a sender device may send an RF synchronization request packet to the intended receiver using the PLC interface. When sending the RF synchronization request packet, the sender device may use PLC transmit parameters stored for the receiver or a default mode (for example, ROBO mode) if none are stored. The RF synchronization packet may or may not trigger a Tone Map Response from the receiver. Upon receiving an RF synchronization request packet, the recipient device responds with an RF synchronization reply packet. The synchronization reply packet includes the offset from the start of the current slot and an identifier for the current slot.

According to another example embodiment, the RF interface is utilized to obtain transmit parameters for PLC. In a similar fashion to the previous example embodiment described above, a device may send a PLC synchronization request packet to the intended receiver using RF. When sending the PLC synchronization request packet, the sender device may use a variety of methods available on RF (for example, with CG-Mesh, async transmissions sending across all channels back-to-back, during a broadcast slot, or using a unicast schedule). The PLC synchronization request packet may or may not trigger an RF synchronization response. Upon receiving a PLC synchronization request packet, the recipient device responds with a PLC synchronization reply packet. The synchronization reply packet comprises a tone map response (for example, tone map, modulation, data rate, sub-carrier transmit power, etc.).

According to another example embodiment, a single interface is used to provide transmission parameters for multiple interfaces simultaneously. Because both RF and PLC MAC frame formats follow IEEE 802.15.4, the RF channel-hopping schedule and PLC tone mapping information may be encoded using IEEE 802.15.4e-2012 Information Elements. In one example embodiment, a sender device may request transmit parameters for both interfaces by sending a single request packet on a single interface. In another example embodiment, a sender device may send requests across both interfaces.

Another example embodiment provides for selecting how transmission parameters are provided to the requester. In one example embodiment, the request indicates on which interface the reply packet should be sent. For example, the request may indicate that the reply should be sent using PLC, RF, or both. In another example embodiment, the receiver of the request may locally determine on which interface the reply packet should be sent. For example, a device may choose based on what information is available in the neighbor table. If RF channel-hopping synchronization exists for the requesting device, the RF synchronization response may be sent using RF. Otherwise, the response is sent using PLC. In another example, a sender device may choose whichever interface is expected to be more efficient based on the transmission parameters already existing in its neighbor table. In yet another example, a sender device may choose based on recent channel conditions (for example, channel activity, congestion, etc.).

Another example embodiment provides for choosing from multiple strategies in obtaining transmit parameters. A sender device can also choose from multiple strategies in obtaining transmit parameters. For example:

1) Send the data packet and include an indication that the link-layer acknowledgment should include transmit parameters.

2) First send a request packet to obtain transmit parameters and then send the data packet.

A sender device may choose from the different metrics based on properties of the data packet (for example, size) and potential gains of using optimal transmit parameters based on certain metrics (for example, latency, energy, etc.). For example, if the packet is large, a sender device may choose to first request the transmit parameters before sending the data packet. However, if latency is a concern, the device may compare the difference in waiting for a request-response round trip vs. sending the data packet immediately.

According to another example embodiment, a device can dynamically select the strategy to use in sending a request/data packet. For example, if a sender device does not have channel-hopping information for a receiving device, it may choose from the following strategies:

1) Perform an async transmission by sending across all channels back-to-back.

2) Wait for a broadcast slot and send the unicast packet according to the broadcast schedule.

3) Send the data packet using PLC.

A sender device may utilize different metrics (energy, latency, channel utilization, etc.) to choose from the strategies above. The particular metric may be selected based on information contained within the packet (for example, traffic class, MAC-layer priority, deep packet inspection, etc.) or the metric may be configured.

Figure 5:
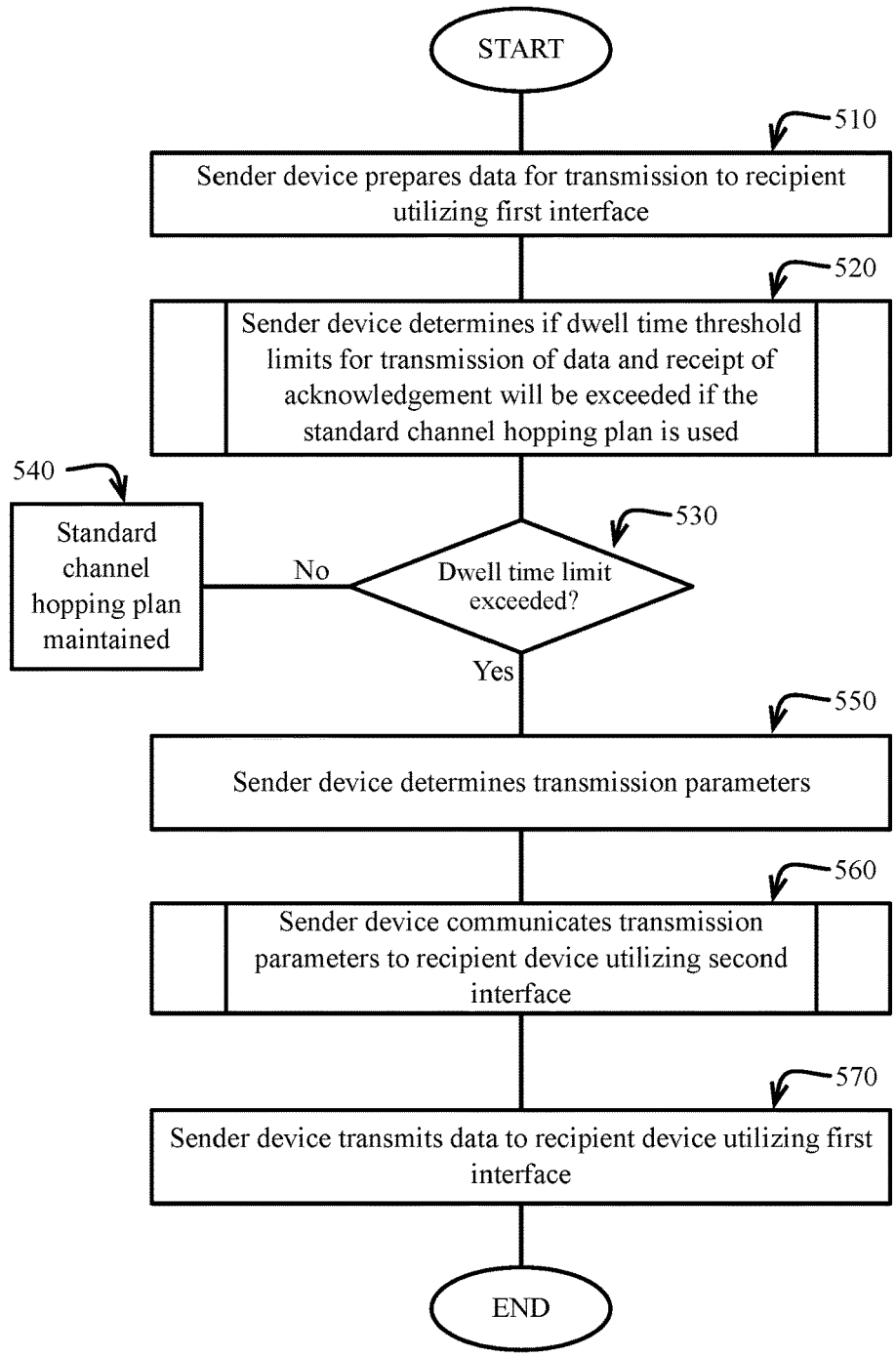
FIG. 5 is a block flow diagram depicting a method for providing data reception parameters in network comprising devices having multiple communication interfaces in accordance with certain example embodiments.

FIG. 5 is a block flow diagram depicting a method 500 for providing data reception parameters in a multiple interface network in accordance with certain example embodiments. The method 500 is described with reference to the components illustrated in FIGS. 1-4.

In an example embodiment, a device 200 is a sender device/node 200a that transmits one or more data packets to one or more recipient devices/nodes 200b over one or more network interfaces 210. In this embodiment, the network interface 210 used to transmit the data packet to the recipient device 200b is a first interface 210a. In this embodiment, an alternate network interface 210 that is additionally or alternatively used to transmit the data packet to the recipient device 200b is a second network interface 210b. In an example embodiment, the recipient device/node 200b transmits one or more acknowledgement packets or other data packets to the one or more sender devices/nodes 200a over the first network interface 210a or the second network interface 210b.

In an example embodiment, each network interface 210 may have multiple channels or other transmission options available for transmission. For example, an RF transmission may comprise multiple channels that the network interface 210 uses to transmit data. Due to regulatory compliance requirements for RF transmissions, the network interface 210a must employ a channel-hopping schedule. The channel-hopping schedule employs a uniform random distribution to pick the channels for transmission. In the example, regulations require that a network interface 210 limit the time spent transmitting on a particular channel, the "dwell time", to 400 milliseconds within a 10 second period. Different channel-hopping requirements and dwell time limitations may be imposed based at least in part on the interface technology and the associated regulatory agency.

In block 510, the sender device 200a prepares data for transmission to the recipient device 200b utilizing the first network interface 210a. In an example embodiment, the data comprises a data packet or data formatted for transmission over the network interface 210. In an alternative example embodiment, the data comprises a series of bytes or characters. In an example embodiment, the sender device 200a prepares the data for transmission to the recipient device 200b by formatting the data into packets. In an alternative example embodiment, the data is prepared by one or more other network devices 200 and transmitted to the sender device 200a.

In an example embodiment, the first network interface 210a may be selected based on any available criteria. For example, the first network interface 210a may be a default network interface 210 for transmissions between the sender device 200a and the recipient device 200b. The first network interface 210a may be selected because the network interface 210a has the most channels, the least data traffic, the highest transmission rates, or any suitable characteristic. The sender device 200a also may determine which network interfaces 210 are available to the recipient device 200b. In example embodiments, the sender device 200a may execute a process to examine available network interfaces 210. For example, the network interfaces 210 or other component of the devices 200 may monitor and log performance of available network interfaces and indicate whether a particular network interface 210 is available for communication based on one or more of the particular network interface 210 being operational and meeting minimum specified communication quality requirements. Additionally, the recipient devices 210b may communicate reports to the sender device 210 that indicate available network interfaces for the recipient devices 210b. Alternatively, the sender device 210a may determine available network interfaces 210 for recipient devices 210b based on network interfaces via which messages are received from the recipient devices 210b.

In block 520, the sender device 200a determines if dwell time threshold limits for transmission of data and receipt of acknowledgement will be exceeded if the standard channel-hopping plan is used. The method 520 for determining whether dwell time threshold limits will be exceeded is described in more detail hereinafter with reference to the methods described in FIG. 6.

Figure 6:
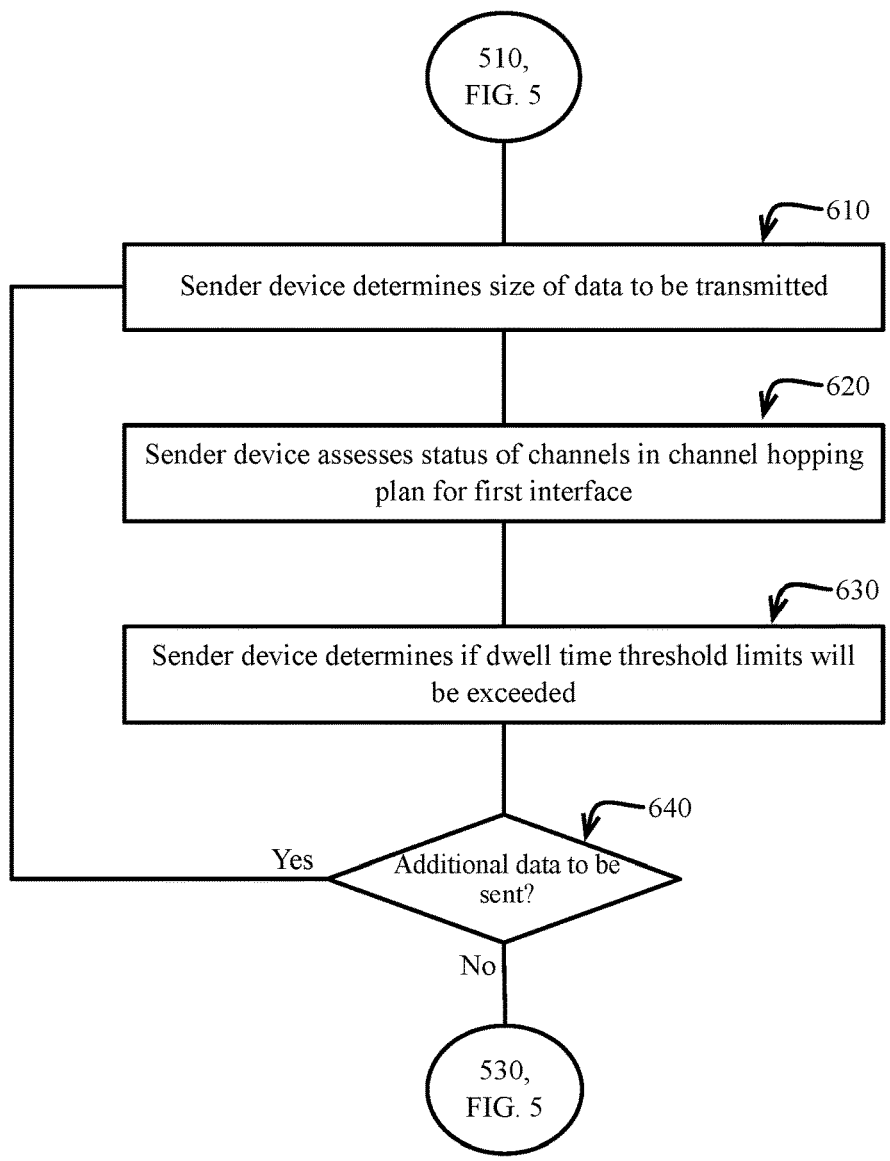
FIG. 6 is a block flow diagram depicting a method for determining whether dwell time threshold limits will be exceeded in accordance with certain example embodiments.

FIG. 6 is a block flow diagram depicting a method 520 for determining whether dwell time threshold limits will be exceeded in accordance with certain example embodiments, as referenced in block 520 of FIG. 5. The method 520 is described with reference to the components illustrated in FIGS. 1-4.

In block 610, the sender device 200a determines the size of data to be transmitted. In an example embodiment, the data may be in one or more packets. The sender device 200a may assess the size of the one or more packets and determine the transmission time required for the data based on data flows over the network interfaces 210. In an example embodiment, the data packets may be in a queue to be transmitted sequentially.

In block 620, the sender device 200a assesses the status of the channels in the channel-hopping schedule of the first network interface 210. In an example embodiment, the status of the channels may be the current and expected volume of traffic on the channels. In another example embodiment, the traffic may be traffic associated with the sender device 200a or the recipient device 200b. In another example embodiment, the traffic may be from other network devices utilizing the same channels with the sender device 200a or the recipient device 200b. In yet another example embodiment, the traffic on the channels may be calculated by comparing the expected traffic with the channel-hopping schedule and predicting the load each channel will encounter at a given time.

In block 630, the sender device 200a determines whether dwell time threshold limits will be exceeded for transmission of the data. For example, the sender device 200a determines a transmission time for the data (or each data packet if appropriate) based on the size of the data and the status of the channels in the channel hopping plan for the first interface. Then, the sender device 200a compares the transmission time with the dwell time threshold limits to determine whether the dwell time threshold limits will be exceeded for transmission of the data.

In an example embodiment, the dwell time threshold may be configured by any suitable party, such as the device 200, another network component, a data provider, a system administrator, or a recipient user. The dwell time threshold may be based at least in part on the maximum dwell time based on a regulatory requirement. The dwell time threshold may additionally or alternatively be based on a dwell time that minimizes the negative effects of the dwell time on the network communication traffic. Any suitable dwell time threshold may be configured.

In block 640, the sender device 200a determines if additional data will need to be sent. For example, the sender device 200a determines if all data packets are sent or scheduled or if additional packets are in the queue. In an example embodiment, if more packets are in the queue, then a dwell time limit calculation will need to be made to account for the additional data packets, as described in blocks 610-630. Accordingly, if one or more data packets are in the queue, the method 520 returns to block 610 and the methods of blocks 610, 620, and 630 are repeated for each data packet.

Returning to block 640, if all of the data packets have been assessed, the method 520 proceeds to block 530 of FIG. 5.

Returning to FIG. 5, in block 530 the sender device 200a determines if the dwell time threshold will be exceeded when transmitting the data with the standard channel-hopping plan, as described previously with reference to block 630 of FIG. 6.

If the dwell time threshold will not be exceeded when transmitting the data with the standard channel-hopping plan, the method 500 proceeds to block 540. In block 540, the sender device 200a transmits the data packet to the recipient device 200b via the first network interface 210a with the standard channel-hopping plan. That is, the configured channel-hopping plan that the recipient device 200b is expecting is utilized. In an example embodiment, no alterations to the channel-hopping plan are required to transmit the data without delays or exceeding the dwell times.

Returning to block 530, if the dwell time threshold will be exceeded when transmitting the data with the standard channel-hopping plan, then the method 500 proceeds to block 550. In block 550, the sender device 200a determines transmission parameters. In an example embodiment, the sender device 200a determines the transmission parameters that will minimize the dwell time of the data transmission.

In an example embodiment, the sender device 200a compares the transmission requirements to the available channels and develops one or more alternate channel-hopping strategies. In an example embodiment, the transmission parameters may comprise a channel, modulation, data rate, or other parameters. The transmission parameters may include a start delay to indicate when the sender device 200a will start the data transmission and an end delay to indicate when the data transmission is expected to end. The transmission parameters may indicate a single channel or a channel-hopping schedule for the transmission. The channel-hopping schedule may also specify the dwell time for all slots or each slot individually.

In an alternate embodiment, the sender device 200a determines transmission parameters in an effort to synchronize with a recipient device 200b. For example, the transmission parameters of the recipient device 200b, such as the channel hopping schedule, may not be known to the sender device 200a because the two devices 200a, 200b have not communicated before, because one of the devices 200 has had a parameter change, or for any suitable reason. If the recipient device 200b is unknown to the sender device 200a, then the sender device 200a must attempt a communication with the recipient device 200b that does not rely on the channel-hopping schedule of the recipient device 200a. Different manners of contacting the recipient device 200b are available, such as transmitting a request over a broadcast slot, broadcasting the data or a transmission request on all channels, or selecting an alternate network interface 210.

In block 560, the sender device 200a communicates the transmission parameters to the recipient device 200b over the second network interface 210b. The method for communicating transmission parameters to the recipient device 200b is described in more detail hereinafter with reference to the methods 560a and 560b as described in FIGS. 7 and 8, respectively.

Figure 7:
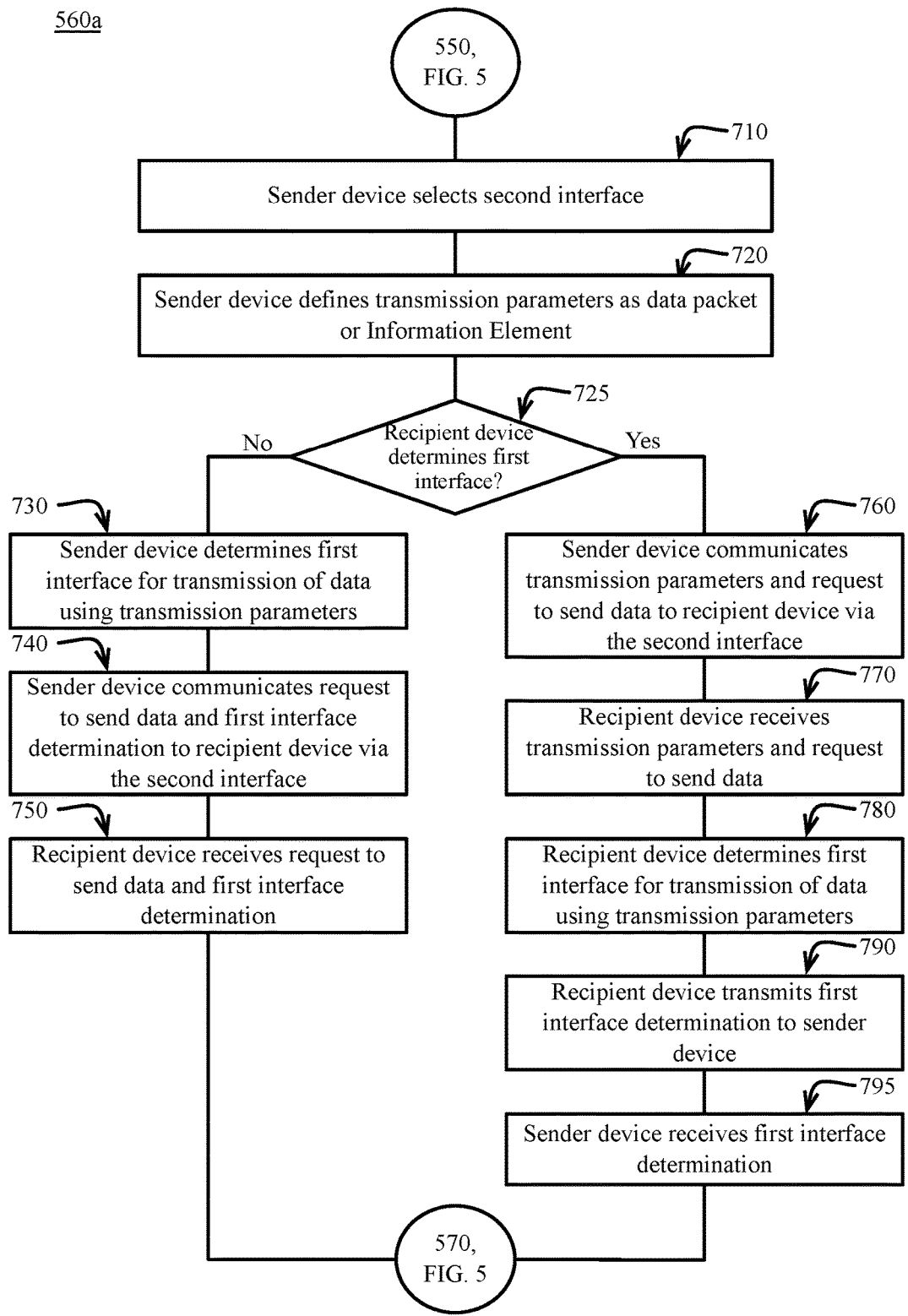
FIG. 7 is a block flow diagram depicting a method for communicating transmission parameters to a recipient device in accordance with certain example embodiments.

FIG. 7 is a block flow diagram depicting a method 560a for communicating transmission parameters to the recipient device 200b in accordance with certain example embodiments, as referenced in block 560 of FIG. 5. The method 560a is described with reference to the components illustrated in FIGS. 1-4.

In block 710, the sender device 200a selects the second network interface 210b. In an example embodiment, the selection may be performed in a similar manner to the selection of the first network interface 210a, as described in block 510 of FIG. 5. In an alternative example embodiment, the second network interface 210b may be selected based on any available criteria. For example, if only two network interfaces 210 are available, then the second network interface 210b will be the one not selected as the first network interface 210a, as described in block 510 of FIG. 5. In another alternative example embodiment, the second interface 210b may be selected based on the number of channels, the data traffic, the transmission rates, or other suitable characteristic of available interfaces 210.

In block 720, the sender device 200a defines transmission parameters as a data packet or an Information Element. In an example embodiment, the data packet or the Information Element comprising the transmission parameters may be prepared to be transmitted alone or attached to another data packet that will be transmitted on the second network interface 210b.

In block 725, the method 560a determines if the recipient device 200b will determine the first network interface 200a for transmitting the data per the transmission parameters. In an example embodiment, the sender device 200a dictates the first network interface 210a. In an alternative example embodiment, the recipient device 200b receives the transmission parameters from the sender device 200a and dictates the first network interface 210a. The determination as to whether the sender device 200a or the recipient device 200b selects the first network interface 210a may be based on the capabilities of the devices (including devices 200a and 200b), the dictates of a system administrator, a configured setting, by another network component, or any suitable person, software, or hardware.

If the recipient device 200b does not determine the first network interface 210a (for example, the sender device 200a determines the first network interface 210a), the method 560a proceeds to block 730. In block 730, the sender device 200a determines the first network interface 210a for transmission of data using transmission parameters. In an example embodiment, the determination is made based at least in part on the transmission parameters defined in block 720. In an example embodiment, the sender device 200a prepares the data to be transmitted to the recipient device 200b based at least in part on the transmission parameters and/or the determined first network interface 210a. For example, the data may be prepared to be sent with the alternate channel-hopping schedule, a single channel transmission, or any other transmission parameter as defined by the transmission parameters and/or the first network interface 210a.

lock 740, the sender device 200a communicates, via the second network interface 210b, a request to send data and an indication of the first network interface 210a via which the data will be transmitted to the recipient device 200b. In an example embodiment, after the sender device 200a determines the first network interface 210a to be used for transmitting the data and prepares the request to send data, the request to send data and an indication of the first network interface 210a are transmitted to the recipient device 200b via the second network interface 210b. In an example embodiment, the second network interface 210b is utilized to prevent the request to send transmission from affecting the dwell time and traffic that is on the first network interface 210a. In an example embodiment, the request comprises sufficient information for the recipient device 200b to prepare the network interfaces 210 to receive the data per the transmission parameters.

In block 750, the recipient device 200b receives, via the second network interface 210b, the request to send data and the first network interface 210a determination. In an example embodiment, the recipient device 200b prepares the first network interface 210a to receive the data per the transmission parameters. That is, the recipient may configure the first network interface 210a to use the alternate channel-hopping schedule, any start or stop delays, or any other transmission parameter transmitted by the sender device 200a.

From block 750 in FIG. 7, the method 560a proceeds to block 570 in FIG. 5.

Returning to block 725 of FIG. 7, if the recipient device 200b determines the first network interface 210a, the method 560 proceeds to block 760.

In block 760, the sender device 200a communicates, via the second network interface 210b, the transmission parameters and a request to send data to the recipient device 200b. In an example embodiment, after determining that the recipient device 200b will dictate the network interface 210 selection, the sender device 200a communicates the transmission parameters and a request to send data to the recipient device 200b to provide the recipient device 200b with enough data to select the first network interface 210a. In an example embodiment, the transmission parameters are transmitted with the request to send data. The communicated transmission parameters are sufficient for the recipient device 200b to select the first network interface 210a. For example, the transmission parameters can comprise an alternate channel-hopping schedule, a start time, an expected end time, and other suitable parameters.

In block 770, the recipient device 200b receives the transmission parameters and the request to send data. In an example embodiment, the recipient device 200b stores the request and the parameters. In an example embodiment, the recipient device 200b compares the transmission parameters to the capabilities of the network interfaces 210 to assist in the selection of the first network interface 210a.

In block 780, the recipient device 200b determines the first interface 210a for transmission of data using the transmission parameters. In an example embodiment, the recipient device 200b selects the first network interface 210a. In an alternative example embodiment, the recipient device 200b also selects other parameters, such as an alternate channel-hopping schedule, a start time, an expected end time, and other suitable parameters. In an example embodiment, the recipient device 200b prepares the first network interface 210a to receive the data based on the transmission parameters.

In block 790, the recipient device 200b transmits the first network interface 210a determination to the sender device 200a. The recipient device 200b transmits any alterations to the transmission parameters. For example, if the channel-hopping schedule in the transmission parameters was inadequate, the recipient device 200b may revise the channel-hopping schedule. In an example embodiment, any other required information needed by the sender device 200a to transmit the data can be provided by the recipient device 200b.

In block 795, the sender device 200a receives, via the second network interface 210b, the first interface 210a determination from the recipient device 200b. In an example embodiment, the sender device 200a additionally receives any alterations to the transmission parameters. In an example embodiment, the sender device 200a configures the first network interface 200a to transmit the data per the information received from the recipient device 200b. Additionally, the recipient device 200b can configure the first network interface 210a to receive the data.

From block 795 in FIG. 7, the method 560a proceeds to block 570 in FIG. 5.

Figure 8:
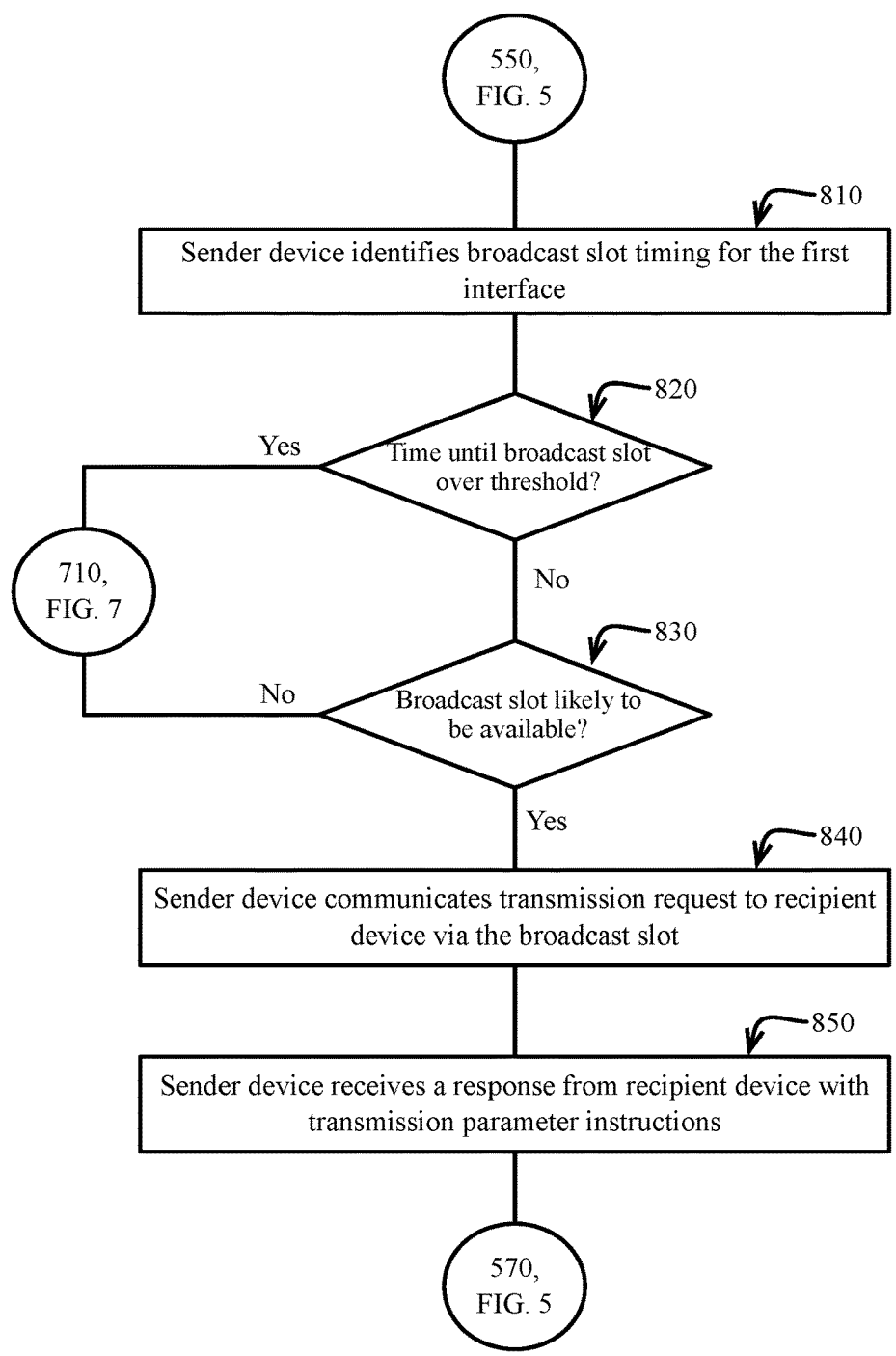
FIG. 8 is a block flow diagram depicting another method for communicating transmission parameters to a recipient device in accordance with certain example embodiments.

FIG. 8 is a block flow diagram depicting a method 560b for communicating transmission parameters to the recipient device 200b in accordance with certain example embodiments. The method 560b is described with reference to the components illustrated in FIGS. 1-4.

In block 810, the sender device 200a identifies a broadcast slot timing for the first network interface 210a. In an example embodiment, the sender device 200a determines if one of the network interfaces 210, such as an RF network interface, utilizes a broadcast slot or channel. In an example embodiment, an RF network interface employs a broadcast schedule that is only active for a fraction of the time (for example, 25%), but allows efficient broadcasts since a single transmission can reach an arbitrary number of neighbors.

In addition to identifying the broadcast slot on the first network interface 210a comprising the broadcast slot, the sender device 200a determines the timing for the broadcast slot. For example, any standard channel-hopping schedule may be instructed to stop on the broadcast channel at a particular time in the schedule. Any broadcast on the particular channel at the particular time slot will be broadcast to any receiver device 200b within range of the transmission. The sender device 200a determines when the next broadcast slot will be. The sender device 200a may further determine if the wait for the next broadcast slot is within a threshold amount of time. For example, the sender device 200a may be configured not to wait for a period of over 500 milliseconds for the next broadcast slot. The threshold may be configured to meet desired system functionality by the sender device 200a, another network component, a system administrator, or any suitable party.

If the sender device 200a determines that the time until the next broadcast slot will be greater than or equal to the threshold, then the method 560b proceeds to block 710 of FIG. 7 to perform the method 560a for communicating transmission parameters to the recipient device 200b.

Returning to block 820 of FIG. 8, if the sender device 200a determines that the time until the next broadcast slot will be less than the threshold, the method 560b proceeds to block 830.

In block 830, the sender device 200a may additionally or alternatively determine whether the broadcast slot is likely to be available and/or sufficient for transmission of the data. Fore example, the sender device 200a can predict the amount of traffic that will be on the broadcast slot at the time of the broadcast. The prediction may be made based on an analysis of previous broadcast slots, the number of devices 200 within range, current traffic on the interface 210a, or any suitable factors. The prediction may calculate the likelihood that the transmission of the sender device 200a will be received by the recipient device 200b. In an example embodiment, a threshold likelihood to achieve desired functionality may be configured by the sender device 200a, another network component, a system administrator, or any suitable party.

If the sender device 200a determines that the likelihood that the transmission will be successful is less than the threshold, then the method 560*b* proceeds to block 710 of FIG. 7 to perform the method 560*a* for communicating transmission parameters to the recipient device 200*b*.

Returning to block 830 of FIG. 8, if the sender device 200*a* determines that the likelihood that the transmission will be successful is greater than or equal to the threshold, the method 560*b* proceeds to block 840. In block 840, the sender device 200*a* communicates a transmission request to the recipient device 200*b* via the broadcast slot. The request may be received by any device 200 within range. The request may have identification data in the request to allow the recipient device 200*b* to recognize that the request is directed to the recipient device 200*b*.

In block 850, the sender device 200*a* receives a response from recipient device 200*b* with transmission parameter instructions. In an example embodiment, the transmission parameter instructions may be the standard channel-hopping schedule of the recipient device or an alternate channel hopping schedule. In an alternative example embodiment, the transmission parameter instructions may be directions to employ a single channel for the transmission. Any suitable transmission parameter instructions may be received by the sender device 200*a*.

From block 850, the method 560*b* proceeds to block 570 of FIG. 5. Returning to FIG. 5, in block 570, the sender device 200*a* transmits the data to the recipient device 200*b* utilizing the first network interface 200*a*. In an example embodiment, the transmission comprises any transmission parameters dictated by either the sender device 200*a* or the recipient device 200*b*. With proper interface selection and transmission parameters, the transmission may be sent with acceptable dwell times and minimal data flow conflicts.

As described herein, transmission parameters for packet transmissions on one PHY can be dynamically communicated using another PHY. The transmission parameters on a first PHY can be communicated either in a dedicated control packet or piggybacked on a data packet. A node receiving the transmission parameters can provide feedback using the first PHY for transmission parameters for sending the data acknowledgment. The sender then transmits the data packet on the second PHY using the transmission parameters communicated on the first PHY.

As described herein, latency and throughput can be improved in a multi-PHY LLN. Using a first PHY to communicate transmission parameters for a second PHY allows devices to avoid delayed transmissions due to dwell time limits. Additionally, using a first PHY to deviate from the default transmission parameters for the second PHY allows a sender to avoid congestion when conditions are likely to occur or are detected.

The techniques described herein can obtain transmit parameters in an on-demand fashion within a multi-PHY LLN. A first PHY can be used to obtain transmission parameters for a second PHY. For example, PLC can be used to obtain the channel-hopping schedule for RF, or RF can be used to obtain the tone mapping parameters for PLC. A device may request such transmit parameters individually or for multiple PHYs in a single request-response exchange. A device may choose to first request transmission parameters before sending a data packet or may piggyback the request in the data packet itself based on properties of the data packet and potential gains when using optimal transmit parameters. A device may also choose from multiple strategies (for example, async transmission, bcast slot, PLC, etc.) in sending the request/data packet based on the energy, latency, etc.

The techniques described herein may improve latency and throughput in a multi-PHY LLN by utilizing the capabilities of additional PHYs to obtain transmission parameters for a given PHY. For example, rather than relying on async transmissions or broadcast schedules, a device can utilize PLC to obtain RF channel-hopping synchronization. Cost (for example, memory, communication, energy, etc.) of maintaining per-neighbor state in a multi-PHY LLN can be reduced. By using an on-demand approach, devices can maintain transmission parameters only when used. Furthermore, initial synchronization and resynchronization of neighbor state is less costly.

Figure 9:
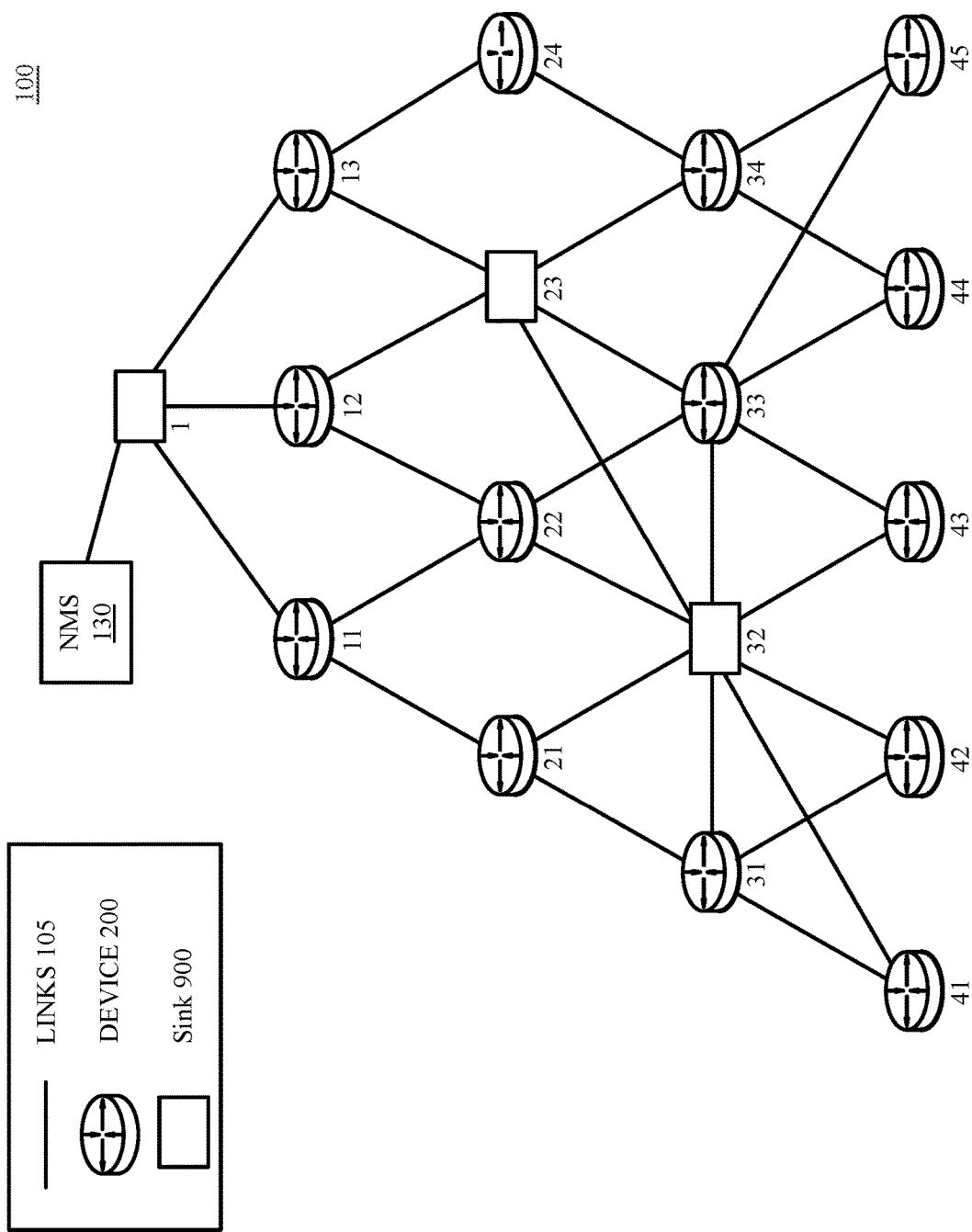
FIG. 9 is a block diagram depicting an example communication network in accordance with certain alternative example embodiments.

Although the above-described techniques have been illustrated with respect to an LLN in which network traffic transits through the root/LBR, it should be noted that the techniques described herein may be generally applied to any network, particularly to any constrained network. For example, as shown in FIG. 9, a network 100 that does not have a central node through which all traffic is piped (for example, like the LBR of an LLN), may have one or more sinks 900 that reside at strategic locations throughout the network (for example, nodes 1, 23, and 32) to ensure that all potential traffic within the network may be monitored and routed according to the techniques described herein. In such an environment, the sinks may operate independently or in collaboration (for example, with each other or with an NMS) to perform the techniques described herein.

The techniques described herein may be performed by hardware, software, and/or firmware, such as in accordance with the "QoS monitoring" process 248/248*a* shown in FIG. 2, which may contain computer executable instructions executed by the processor 220 (or independent processor of interfaces 210) to perform functions relating to the techniques described herein, for example, in conjunction with routing process 244. For example, the techniques herein may be treated as extensions to conventional protocols, such as the various PLC protocols or wireless communication protocols, and as such, may be processed by similar components understood in the art that execute those protocols.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, an ordinarily skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be repeated, performed in a different order, in parallel with one another, omitted entirely, and/or combined between different example embodiments, and/or certain additional acts can be performed, without departing from the scope and spirit of various embodiments. Accordingly, such alternative embodiments are included in the invention claimed herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A computer-implemented method, comprising:
   in a multi-PHY, low power and lossy network (LLN) comprising a plurality of nodes, determining that transmission of data over a first broadcast mechanism in a first network interface is undesirable based at least in part on a determination that transmission of the data over the first broadcast mechanism in the first network interface would result in one or more predetermined dwell time limits being exceeded, wherein the first network interface comprises a power line communication interface;
   in response to determining that transmission of the data over the first broadcast mechanism is undesirable:
      determining transmission parameters for a transmission of the data from a sender node to a receiver node via the first network interface;
      transmitting, by the sender node, the transmission parameters to the receiver node via a second network interface, wherein the second network interface is different than the first network interface; and
      transmitting, by the sender node, the data to the receiver node via a second broadcast mechanism in the first network interface, wherein the second broadcast mechanism in the first network interface was determined using the transmission parameters.

2. The computer-implemented method of claim 1, wherein determining that the transmission of the data via the first broadcast mechanism on the first network interface is undesirable further comprises determining that a time until the first broadcast mechanism is available exceeds a predefined threshold.

3. The computer-implemented method of claim 1, wherein determining that the transmission of the data via the first broadcast mechanism on the first network interface is undesirable is further based on determining that the first broadcast mechanism is not available.

4. The computer-implemented method of claim 1, wherein determining that the transmission of the data via the first broadcast mechanism on the first network interface is undesirable is further based on determining that the first broadcast mechanism is not sufficient for the transmission of the data.

5. The computer-implemented method of claim 1, wherein the transmission parameters comprise one or more of a first network interface channel, a modulation, a data rate, a transmission start time, a transmission end time, a channel-hopping schedule, or a dwell time for channels in the channel-hopping schedule.

6. The computer-implemented method of claim 1, wherein the data comprises two or more data messages.

7. The computer-implemented method of claim 1, further comprising receiving, from the receiver node, an indication of the second broadcast mechanism in the first network interface via which to transmit the data.

8. The computer-implemented method of claim 7, wherein the receiver node determines the second broadcast mechanism in the first network interface via which to transmit the data in response to receiving the transmission parameters and transmits an identity of the determined second broadcast mechanism to the sender node via the second network interface.

9. The computer-implemented method of claim 1, further comprising determining, using the transmission parameters, the second broadcast mechanism in the first network interface via which to transmit the data.

10. The computer-implemented method of claim 9, wherein the transmission parameters transmitted to the receiver node via the second network interface comprise an indication of the second broadcast mechanism in the first network interface via which the data will be transmitted.

11. An apparatus, comprising:
   one or more network interfaces to communicate in a multi-PHY, low power and lossy network (LLN) comprising a plurality of nodes;
   a processor coupled to the one or more network interfaces and adapted to execute one or more processes; and
   a memory configured to store a process executable by the processor, the process when executed operable to:
      determine that transmission of data via a first broadcast mechanism on a first network interface is undesirable based at least in part on a determination that transmission of the data over the first broadcast mechanism in the first network interface would result in one or more predetermined dwell time limits being exceeded;
      in response to determining that the transmission of data via the first broadcast mechanism on the first network interface is undesirable:
         determine transmission parameters for the transmission of the data over the first network interface;
         determine a second mechanism in the first network interface to transmit the data, wherein the second mechanism is determined using the transmission parameters;
         transmit the transmission parameters to a receiver node over a second network interface, wherein the second network interface comprises a power line communication interface, wherein the second network interface is different than the first network interface, and wherein the transmission parameters comprise an indication of the second mechanism in the first network interface via which the data will be transmitted; and transmit the data via the determined second mechanism in the first network interface.

12. The apparatus as in claim 11, wherein determining that transmission of the data via the first broadcast mechanism on the first network interface is undesirable is further based on determining that a time until the first broadcast mechanism is available exceeds a predefined threshold based on an identified timing for the first broadcast mechanism on the first network interface.

13. The apparatus as in claim 11, wherein determining that the transmission of the data via the first broadcast mechanism on the first network interface is undesirable is further based on determining that the first broadcast mechanism is not available or not sufficient for the transmission of the data.

14. The apparatus as in claim 11, wherein the transmission parameters comprise one or more of a first network interface channel, a modulation, a data rate, a transmission start time, a transmission end time, a channel-hopping schedule, or a dwell time for channels in the channel-hopping schedule.

15. The apparatus as in claim 11, wherein the data comprises two or more data messages.

16. A tangible, non-transitory, computer-readable media having software encoded thereon, the software when executed by a processor operable to:
in a multi-PHY, low power and lossy network (LLN) comprising a plurality of nodes, determine that transmission of data over a first broadcast mechanism on a first network interface is undesirable based at least in part on a determination that transmission of the data over the first broadcast mechanism in the first network interface would result in one or more predetermined dwell time limits being exceeded;
in response to determining that the transmission of the data over the first broadcast mechanism on the first network interface is undesirable, determine transmission parameters for the transmission of the data over the first network interface;
transmit the transmission parameters to a receiver node over a second network interface, wherein the second network interface comprises a power line communication interface, wherein the second network interface is different than the first network interface;
receive, from the receiver node, an indication of a second broadcast mechanism in the first network interface via which to transmit the data, wherein the receiver node determines the second broadcast mechanism in the first network interface to transmit the data based on the transmission parameters and transmits an indication of the determined second broadcast mechanism via the second network interface; and
in response to receiving the indication of the determined second broadcast mechanism in the first network interface via which to transmit the data, transmit the data via the determined second broadcast mechanism in the first network interface to the receiver node.

17. The computer-readable media as in claim 16, wherein determining that the transmission of the data via the first broadcast mechanism on the first network interface is undesirable is further based on determining that a time until the first broadcast mechanism is available exceeds a predefined threshold.

18. The computer-readable media as in claim 16, wherein determining that the transmission of the data via the first broadcast mechanism on the first network interface is undesirable comprises determining that a broadcast slot for the first network interface is not available.

19. The computer-readable media as in claim 16, wherein the transmission parameters comprise one or more of a first network interface channel, a modulation, a data rate, a transmission start time, a transmission end time, a channel-hopping schedule, or a dwell time for channels in the channel-hopping schedule.

20. The computer-readable media as in claim 16, wherein the data comprises two or more data messages.

* * * * *